United States Patent
Deshpande et al.

(10) Patent No.: US 8,554,163 B2
(45) Date of Patent: Oct. 8, 2013

(54) SYSTEM AND METHOD FOR DYNAMIC CELL SEARCHING

(75) Inventors: Yogen N. Deshpande, San Diego, CA (US); Bhupesh M. Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 815 days.

(21) Appl. No.: 12/632,705

(22) Filed: Dec. 7, 2009

(65) Prior Publication Data

US 2011/0136530 A1    Jun. 9, 2011

(51) Int. Cl.
*H04B 17/02* (2006.01)
*H04B 7/00* (2006.01)
*H04B 1/04* (2006.01)

(52) U.S. Cl.
USPC ...... 455/135; 455/522; 455/127.1; 455/226.3

(58) Field of Classification Search
USPC .......... 455/67.11, 226.1, 63.3, 450, 135, 455/161.3, 277.2, 115.3, 134, 226.2, 522, 455/68–70, 126, 127.1, 226.3, 422.1, 424, 455/436–444; 370/344, 468, 395.4, 331
See application file for complete search history.

(56) References Cited

U.S. PATENT DOCUMENTS

| | | | | |
|---|---|---|---|---|
| 6,052,598 A * | 4/2000 | Rudrapatna et al. | ....... | 455/456.1 |
| 6,775,548 B1 * | 8/2004 | Rong et al. | ................ | 455/452.2 |
| 6,831,906 B2 * | 12/2004 | Malladi et al. | ................ | 370/336 |
| 7,711,367 B2 * | 5/2010 | Cheng et al. | ................ | 455/439 |
| 7,844,265 B2 * | 11/2010 | Kuchibhotla et al. | ......... | 455/423 |
| 8,145,263 B2 * | 3/2012 | van Rooyen | ............... | 455/552.1 |
| 2003/0104849 A1 | 6/2003 | Arimitsu | | |
| 2005/0059421 A1 * | 3/2005 | Reed et al. | .................... | 455/522 |
| 2006/0128370 A1 * | 6/2006 | Tahara | .......................... | 455/420 |
| 2007/0123198 A1 * | 5/2007 | Okagaki | ....................... | 455/403 |
| 2007/0149131 A1 * | 6/2007 | Li et al. | ....................... | 455/67.11 |
| 2008/0057969 A1 * | 3/2008 | Agami et al. | ................. | 455/450 |
| 2009/0029653 A1 * | 1/2009 | Halfmann et al. | ............... | 455/69 |
| 2009/0253469 A1 * | 10/2009 | Herczog | ....................... | 455/573 |
| 2009/0264069 A1 * | 10/2009 | Yamasuge | ..................... | 455/41.1 |
| 2010/0142485 A1 * | 6/2010 | Lee et al. | ....................... | 370/331 |

FOREIGN PATENT DOCUMENTS

| | | |
|---|---|---|
| EP | 0553771 | 8/1993 |
| GB | 2305825 A | 4/1997 |
| WO | 2010141936 | 12/2010 |

OTHER PUBLICATIONS

International Search Report and Written Opinion—PCT/US2010/058769, International Search Authority—European Patent Office—Feb. 28, 2011.

* cited by examiner

*Primary Examiner* — Dominic E Rego
(74) *Attorney, Agent, or Firm* — Rupit M. Patel

(57) ABSTRACT

Systems and methods for signal detection are dynamic cell searching are disclosed. In one embodiment, the period according to which a channel is monitored is dynamically adjusted according to a condition of an electronic device. In another embodiment, between a first and second monitoring of a channel of a first cell, the amount of time searching for an second cell is dynamically adjusted according to a charging condition of an electronic device.

15 Claims, 8 Drawing Sheets

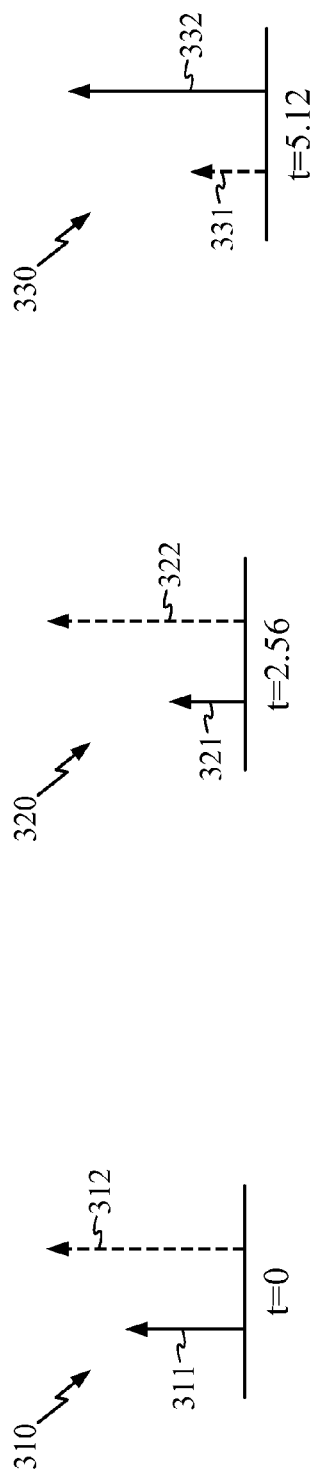
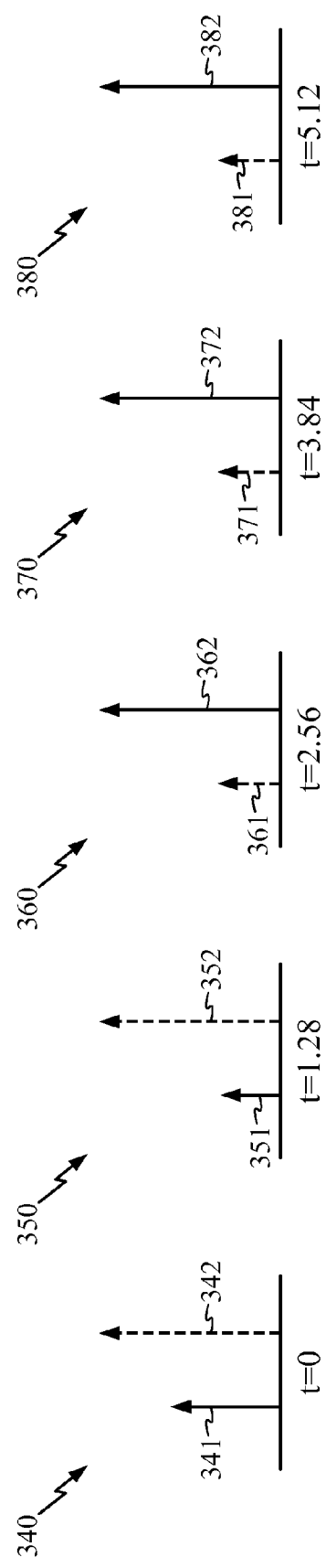
FIG. 3A
FIG. 3B

SYSTEM AND METHOD FOR DYNAMIC CELL SEARCHING

BACKGROUND

1. Field

This disclosure relates to monitoring channels of a cell and searching for cells.

2. Description of the Related Technology

A wireless communication device can conserve battery power by depowering certain circuitry when that circuitry is not in use. If the device desires to monitor a channel of a serving cell or to search for another cell, particular circuitry needs to be powered to perform the monitoring or the searching operation. Therefore, the device cycles between a non-power-conservation mode wherein particularly circuitry is powered and a power-conservation mode wherein the particular circuitry is not powered. Accordingly, the device uses more power, either from a battery or an external power source or both, while in a non-power-conservation mode than while in a power-conservation mode.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features of this invention provide for dynamic cell searching.

One aspect is a method of determining channel conditions at an electronic device, the method comprising periodically, according to a first period, determining a channel condition of at least one channel, determining a condition of the electronic device, selecting a second period different from the first period based at least in part on the determined condition of the electronic device, and periodically, according to the second period, determining the channel condition of the at least one channel.

Another aspect is an electronic device comprising a transceiver configured to wirelessly communicate over at least one channel, and a processor configured to periodically, according to a first period, determine a channel condition of at least one of the channels, determine a condition of the electronic device, select a second period different from the first period based at least in part on the determined condition of the electronic device, and periodically, according to the second period, determine the channel condition of the at least one of the channels.

Another aspect is an electronic device comprising means for periodically, according to a first period, determining a channel condition of at least one channel, means for determining a condition of the electronic device, means for selecting a second period different from the first period based at least in part on the determined condition of the electronic device, and means for periodically, according to the second period, determining the channel condition of the at least one channel.

Yet another aspect is a computer-readable medium storing instructions which, when executed by one or more processors, causes a computer to perform a method of determining channel conditions at an electronic device, the method comprising periodically, according to a first period, determining a channel condition of at least one channel, determining a condition of the electronic device, selecting a second period different from the first period based at least in part on the determined condition of the electronic device, and periodically, according to the second period, determining the channel condition of the at least one channel.

One aspect is a method of searching for a cell, the method comprising determining a charging condition of an electronic device, selecting a search time duration based at least in part on the charging condition, and periodically, according to a predetermined period, searching for a cell for the search time duration within each period.

Another aspect is an electronic device comprising a transceiver configured to wirelessly communicate with a cell and a processor configured to determine a charging condition of the electronic device, select a search time duration based at least in part on the charging condition, and periodically, according to a predetermined period, search for the cell for the search time duration within each period.

Another aspect is an electronic device comprising means for determining a charging condition of the electronic device, means for selecting a search time duration based at least in part on the charging condition, and means for periodically, according to a predetermined period, searching for a cell for the search time duration within each period.

Yet another aspect is a computer-readable medium storing instructions which, when executed by one or more processors, causes a computer to perform a method of searching for a cell, the method comprising determining a charging condition of an electronic device, selecting a search time duration based at least in part on the charging condition, and periodically, according to a predetermined period, searching for a cell for the search time duration within each period.

BRIEF DESCRIPTION OF THE DRAWINGS

FIG. 3A illustrates a reselection procedure with a wake-up period equal to the DRX cycle.

FIG. 3B illustrates a reselection procedure with a wake-up period less than the DRX cycle.

DETAILED DESCRIPTION

Figure 1:
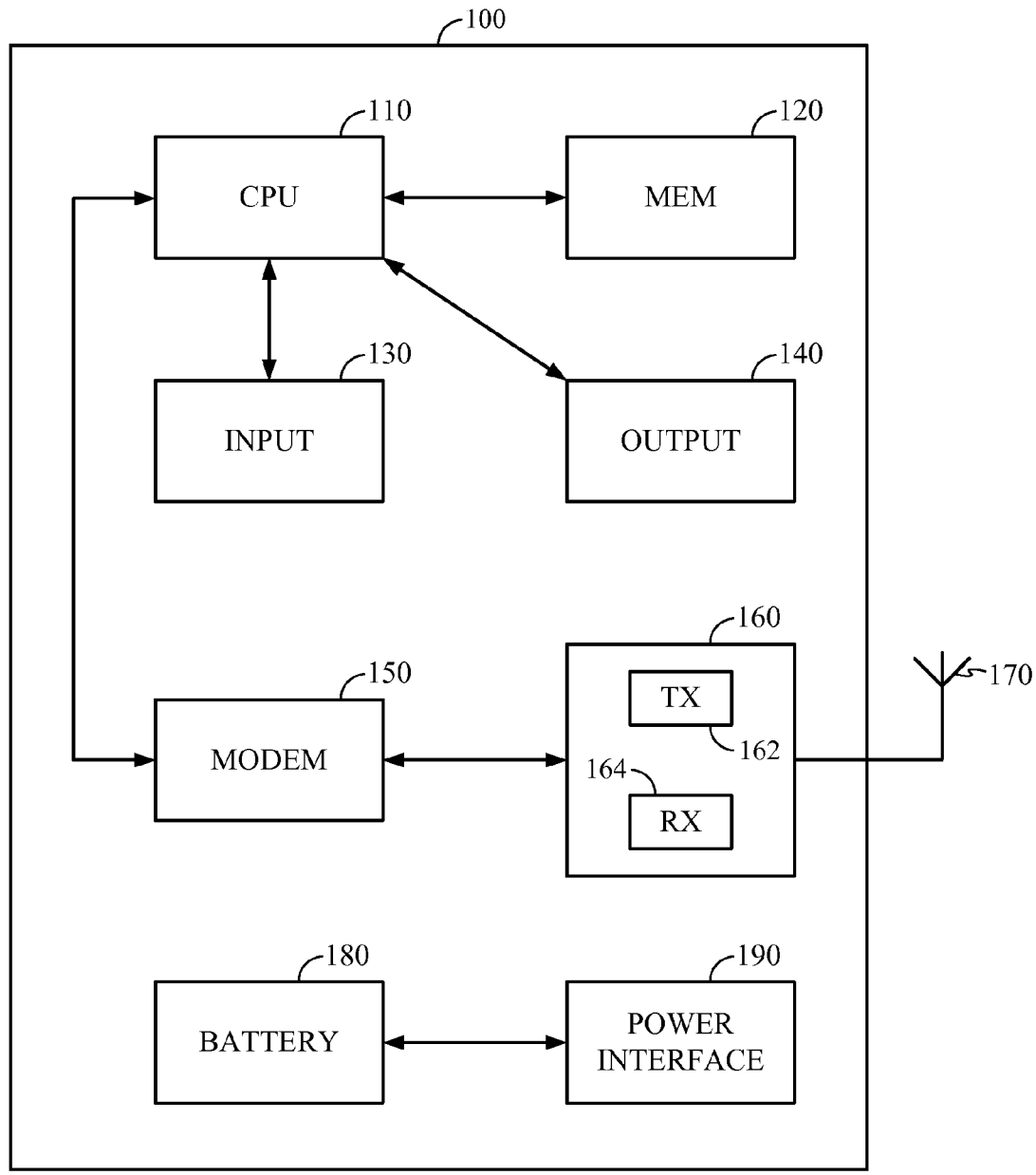
FIG. 1 is a functional block diagram of a wireless communication device.

FIG. 1 is a functional block diagram of a wireless communication device. The wireless communication device 100 includes a processor 110 in data communication with a memory 120, an input device 130, and an output device 140. The processor is further in data communication with a modem 150 and a transceiver 160. The transceiver 160 is also in data communication with the modem 150 and an antenna 170. The wireless communication device 100 and components thereof are powered by a battery 180 and/or an external power source. In some embodiments, the battery 180, or a portion thereof, is rechargeable by an external power source via a power interface 190. Although described separately, it is to be appreciated that functional blocks described with respect to the wireless communication device 100 need not be separate structural elements. For example, the processor 110 and memory 120 may be embodied in a single chip. Similarly, two or more of the processor 110, modem 150, and transceiver 160 may be embodied in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 110 can be coupled, via one or more buses, to read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 is also coupled to an input device 130 and an output device 140 for, respectively, receiving input from and providing output to, a user of the wireless communication device 100. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 110 is further coupled to a modem 150 and a transceiver 160. The modem 150 and transceiver 160 prepare data generated by the processor 110 for wireless transmission via the antenna 170 according to one or more air interface standards. The modem 150 and transceiver 160 also demodulate data received via the antenna 170 according to one or more air interface standards. The transceiver can include a transmitter 162, a receiver 164, or both. In other embodiments, the transmitter 162 and receiver 164 are two separate components. The modem 150 and transceiver 160, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

The wireless communication device 100 and components thereof are powered by a battery 180 and/or an external power source. The battery 180 can be any device which stores energy, and particularly any device which stores chemical energy and provides it as electrical energy. The battery 180 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some embodiments, the battery 180, or a portion thereof, is rechargeable by an external power source via a power interface 190. The power interface 190 can include a jack for connecting a battery charger, an inductor for near field wireless energy transfer, or a photovoltaic panel for converting solar energy into electrical energy.

In some embodiments, the wireless communication device 100 is a mobile telephone, a personal data assistant (PDAs), a hand-held computer, a laptop computer, a wireless data access card, a GPS receiver/navigator, a camera, an MP3 player, a camcorder, a game console, a wrist watch, a clock, or a television.

Figure 2:
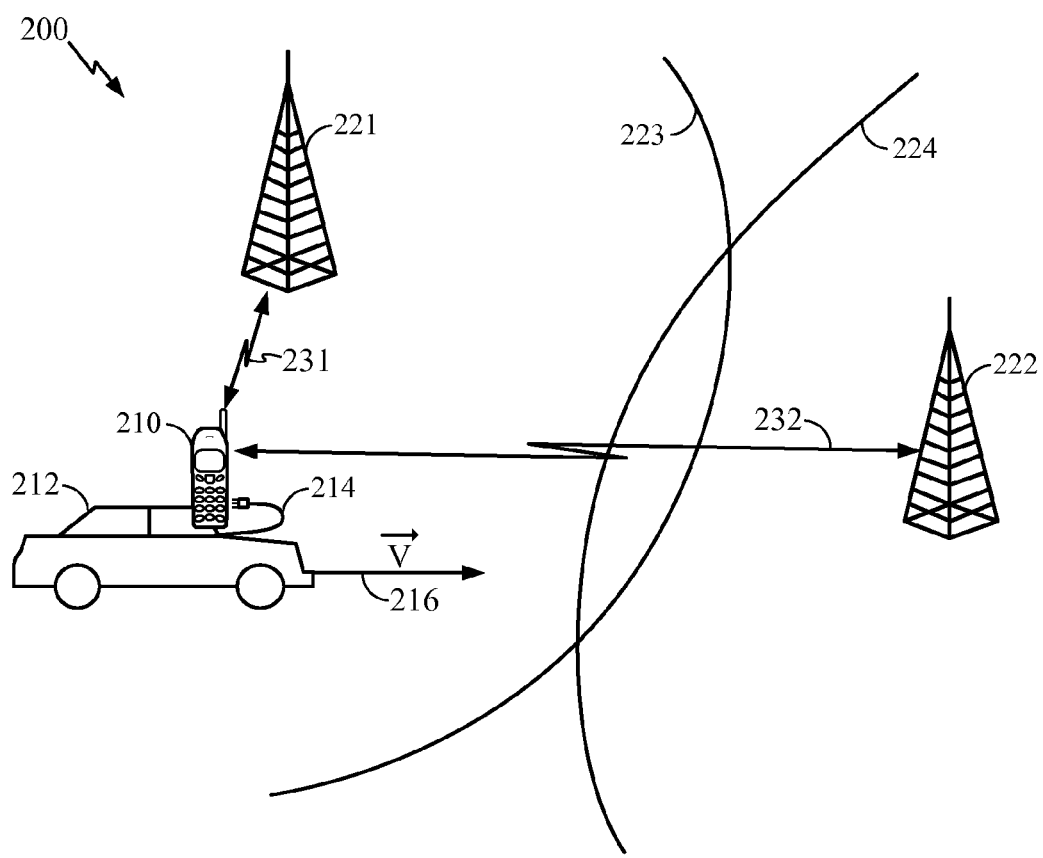
FIG. 2 is a diagram of a wireless communication device in communication with two cells.

FIG. 2 is a diagram of a wireless communication device 210 in communication with two cells. The wireless communication device 210 communicates with a first cell 221 via a first communication link 231 and via a second cell 222 via a second communication link. The first cell 221 has a first coverage area 223 in which the first communication link 231 is usable, whereas the second cell 222 has a second coverage area 224 in which the second communication link 232 is usable. As shown in FIG. 2, the coverage areas 223, 224 can at least partially overlap.

In FIG. 2, the wireless communication device 210 is within a vehicle 212 having a velocity indicated by a vector 216. The wireless communication device 210 is moved by the vehicle 212 from the first coverage area 223 towards the second coverage area 224. The wireless communication device 210 is also charged by an external power source contained in the vehicle, such as the vehicular battery, via an in-car battery charger 214.

The first cell 221 and the second cell 222 may be cells of the same technology (e.g., WCDMA or GSM) in the same service provider network, cells of different technology (e.g., WCDMA and GSM) in the same service provider network, or cells of the same or different technology in different service provider networks. The first cell 221 and the second cell 222 may provide different services, such as emergency calls only, circuit-switched communication, or packet-switched communication.

In FIG. 2, the wireless communication device 210 is within the first coverage area 223 and is in active communication with the first cell 221 via the first communication link 231. A user of the wireless device may desire an active connection with the second cell 222 via the second communication link 232 in addition to or instead of the connection with the first cell 221 for a number of reasons. For example, the first cell 221 may be part of a "roaming" network, whereas the second cell 222 is part of a "home" network, and therefore the billing rates for using the second cell 222 are less than those of the first cell 221. As another example, the first cell 221 may use a first technology, such as GSM, whereas the second cell 222 uses a second technology, such as WCMDA, and therefore provides for better performance.

In one embodiment, the wireless communication device 210 tries to conserve battery power by turning off most of its circuitry while not in active use, e.g., not engaged in a call. If the device 210 is being serviced by a first cell 221 and desires to search for another (or preferred) cell, particular circuitry needs to be powered to perform the search operation. Therefore, the device 210 cycles between "search" (when particularly circuitry is powered) and "sleep" (where the particular circuitry is not powered). This cycle can be uniform with a constant period between searches and a constant search-sleep duty cycle, or either or both of the period and duty cycle be vary.

When the device 210 is receiving power from an external power supply, or when the device 210 is charged to at least a predetermined threshold battery charge level, conserving battery power is less of a priority and the device 210 can spend a greater fraction of time searching to find the second cell 222 more quickly or to track changes in channel conditions of the communication link 231 with the first cell 221 due to mobility and search for handover candidates such as the communication link 232 with the second cell 222.

Accordingly, depending on a condition of the device 210, such as a charging condition, the device 210 can employ a more aggressive search pattern with a higher search/sleep duty cycle and/or a shorter period between searches. Relevant conditions of the device can include whether the device 210 is being charged by an external power source, a battery level of the battery of the device 210, a speed of the device 210 as estimated through GPS or other techniques, a measure of the variability of channel conditions, or the position of the device 210.

One embodiment is described below with respect to WCDMA idle cell reselection. In a WCDMA system, a user equipment (UE) such as a mobile phone operates in discontinuous reception (DRX) mode while idle, i.e. not in an active cell. The UE periodically powers particular circuitry to reacquire the serving cell, monitor for incoming calls, search for neighboring cells, and if certain conditions are met, trigger reselection procedures to change the serving cell to one of the neighboring cells. If reselection is not triggered, the UE powers down the particular circuitry and "sleeps" until the next "wake-up" instance. The maximum period between two wake-ups is dictated by the network and is called a DRX cycle. If the DRX cycle is long and the UE is moving at a high speed, then the signal conditions can change between two DRX cycles. If the serving cell signal deteriorates before the next DRX cycle, the serving cell reacquisition can fail and if the device had received a page for an incoming call in that DRX cycle, the UE would miss the page.

In one embodiment, the wireless device estimates its speed while it is awake and if the speed is above a predefined threshold, the wireless device reduces the period between two wake-ups. Thus, in addition to the wake-ups dictated by the network's DRX cycle, the UE also wakes up in between to track the signal and perform adjustments for reacquisition of the serving cell and to perform measurements of neighboring cells to trigger reselection if needed.

In one embodiment, the speed of the UE is estimated using Adaptive Pilot Filtering in which a filter coefficient is adaptively changed to minimize the error between the filtered and instantaneous signal. The variability of the filter coefficient is indicative of channel change caused by, among other things, the speed of the UE. In another embodiment, the speed is estimated using GPS coordinates determined during different wake-up periods.

Although the above described embodiment may increase power consumption and reduce battery life due to the additional time spent powering the particular circuitry used to search for neighboring cells and to obtain the channels conditions between the UE and the serving and neighboring cells, this effect can be mitigated by only decreasing the period between wake-ups when the device is charging or when the battery level is above a predetermined threshold. With more frequent wakeups, the device can track changes in the serving cell chip position and reduce the probability of reacquisition failure, increase the probability of finding desirable neighboring cells, track the weakening of a serving cell signal more proactively, and reduce the delay in reselection due to the $T_{resel}$ timer, thus reducing the percentage of DRX cycles the UE is on a weak serving cell.

FIG. 3A illustrates a reselection procedure with a wake-up period equal to the DRX cycle, whereas FIG. 3B illustrates a reselection procedure with additional wake-up periods. In both FIGS. 3A and 3B, the DRX cycle is 2.56 seconds.

In FIG. 3A, at time zero, a wireless device is being serviced by a first cell and is searching for a second, neighboring cell. The diagram at zero DRX cycles 310 shows the received signal power of the first cell 311 as compared to the received signal power of a second cell 312. Here, the received signal power of the first cell 311 is less than the received signal power of the second cell 312, and a timer is started. The diagram after one DRX cycle 320 shows the received signal power of the first cell 321 is still less than the received signal power of the second cell 322. At this point, the timer is checked and is equal to one DRX cycle, or 2.56 seconds. Assuming a threshold of one second, the timer is greater than the threshold and reselection is triggered. The reselection process takes, in one embodiment, about half a second. If the network were to send a page for an incoming call after one DRX cycle, the wireless device is likely to miss it due to the low received signal power 321 of the serving cell. Between the first and second DRX cycles, reselection is complete and the wireless device is being serviced by the second cell and is tracking the first cell as a neighboring cell. The diagram after two DRX cycles 330 shows that the received signal power on the first cell 331 is still less than the received signal power on the second cell 332, which is now serving the wireless device.

In FIG. 3B, at time zero, a wireless device is being serviced by a first cell and is searching for a second, neighboring cell. The diagram at zero DRX cycles 340 shows the received signal power of the first cell 341 as compared to the received signal power of a second cell 342. Just as in FIG. 3A, the received signal power of the first cell 341 is less than the received signal power of the second cell 342, and a timer is started. However, in FIG. 3B, in addition to waking up after one DRX cycle, as shown in the third diagram 360, the wireless device wakes up after half a DRX cycle, as shown in the second diagram 350. The diagram after half a DRX cycle 350 shows the received signal power of the first cell 351 is still less than the received signal power of the second cell 352. At this point, the timer is checked and is equal to half a DRX cycle, or 1.28 seconds. Assuming, again, a threshold of one second, the timer is greater than the threshold and reselection is triggered. The reselection process takes, in one embodiment, about half a second. Before the first DRX cycle is over, reselection is complete and the wireless device is being serviced by the second cell and is tracking the first cell as a neighboring cell.

The diagram after one DRX cycle 360 shows that the received signal power on the first cell 361 is still less than the received signal power on the second cell 362, which is now serving the wireless device. If the network were to send a page for an incoming call after one DRX cycle, the wireless device is likely to receive it due to the high received signal power 362 of the serving cell. The diagram after one-and-a-half DRX cycles 370 shows that the received signal power on the first cell 371 is still less than the received signal power on the second cell 372. Similarly, the diagram after two DRX cycles 380 shows that the received signal power on the first cell 381 is still less than the received signal power on the second cell 382.

Another embodiment is described below with respect to WCDMA cell searching. A WCDMA UE has a Home PLMN (corresponding to a service provider) programmed into a USIM card. In addition, when the UE registers on a Home PLMN cell, the network can transmit to the UE a list of Equivalent PLMNs and Forbidden PLMNs. A PLMN that is neither a Home PLMN, an Equivalent PLMN, or a Forbidden PLMN is a Visitor PLMN. If the UE loses service from its Home PLMN and during a search for service find service on a Visitor PLMN, it can be serviced by the Visitor PLMN as a roaming UE. In idle mode, the UE follows the DRX cycle signaled by the Visitor PLMN cell in order to monitor the paging channel and perform searches for reselection. While being serviced by the Visitor VPLMN, the UE can search for Home PLMN cells on the same or different frequencies. Typically, while being serviced by a Visitor PLMN, the UE wakes up to monitor the Visitor PLMN cell paging channel and perform reselection measurements, then searches for a Home PLMN cell before going back to sleep. In order to search for a Home PLMN cell, the UE keeps certain circuitry powered for a longer time thereby increasing the sleep/search duty cycle and using additional battery power.

Due to concerns of battery power conservation, the Home PLMN search time is limited. However, if the UE is being charged by an external power supply, or if the battery level is above a predetermined threshold, then power conservation is less of a concern, and the device can spend a longer time searching for a Home PLMN cell. Thus, a charging condition of the device can allow for a higher sleep/search duty cycle and increase the chances of finding a Home PLMN cell more quickly.

Figure 4A:
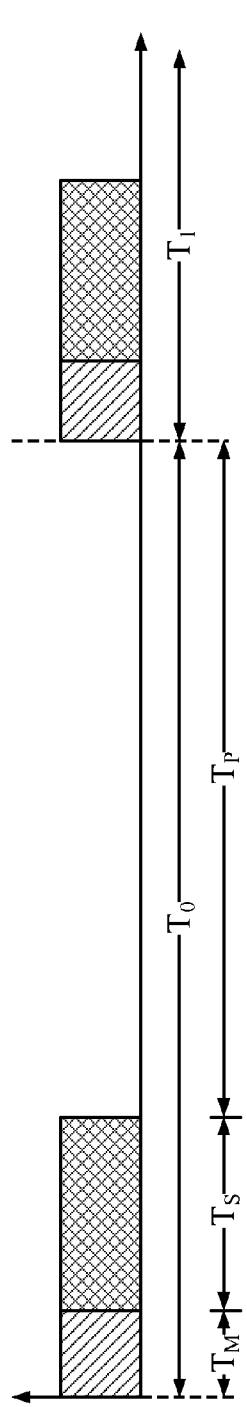
FIG. 4A illustrates a timing diagram of cell searching using a conservative search pattern.

FIG. 4A illustrates a timing diagram of cell searching using a conservative search pattern. In one embodiment, a wireless device using such a cell search pattern is being serviced by a Visitor PLMN and is searching for a Home PLMN. The conservative search pattern may be used when power conservation is a concern, such as when the battery level is below a predetermined threshold or if the wireless device is not being charged. The timing diagram of FIG. 4A begins with the first DRX cycle, $T_0$, which begins with a time period, $T_M$, during which the wireless device reacquires the serving cell and monitors for incoming pages. During this time, the wireless device might also obtain the channel conditions for neighboring cells of the serving PLMN or determine its position or speed using GPS coordinates or Adaptive Pilot Filtering. $T_M$ is followed by another time period, $T_S$, during which the wireless device searches for a cell of the Home PLMN which is in turn followed by a time period, $T_P$, during which the device enters a power-conservative mode by switching off most of its circuitry. The cycle repeats in the second DRX cycle, $T_1$.

Figure 4B:
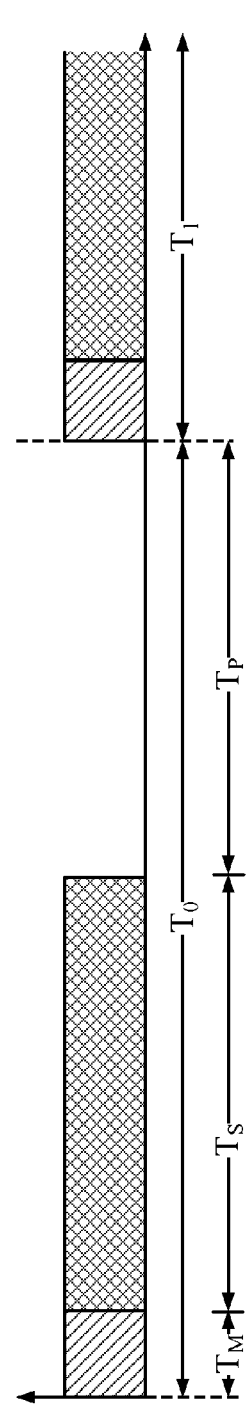
FIG. 4B illustrates a timing diagram of cell searching using an aggressive search pattern.

FIG. 4B illustrates a timing diagram of cell searching using an aggressive search pattern. In one embodiment, a wireless device using such a cell search pattern is being serviced by a Visitor PLMN and is searching for a Home PLMN. The aggressive search pattern may be used when power conservation is not a concern, such as when the battery level is above a predetermined threshold or if the wireless device is being charged. The timing diagram of FIG. 4B begins with the first DRX cycle, $T_0$, which begins with a time period, $T_M$, during which the wireless device reacquires the serving cell and monitors for incoming pages. As above, the wireless device might also obtain the channel conditions for neighboring cells of the serving PLMN or determine its position or speed using GPS coordinates or Adaptive Pilot Filtering during this time. Also as above, $T_M$ is followed by another time period, $T_S$, during which the wireless device searches for a cell of the Home PLMN which is in turn followed by a time period, $T_P$, during which the device enters a power-conservative mode by switching off most of its circuitry. The timing diagram of FIG. 4B differs from that of FIG. 4A in that $T_S$ in FIG. 4B is longer than the corresponding time period in FIG. 4A and $T_P$ in FIG. 4B is shorter than the corresponding time period in FIG. 4A. As in FIG. 4A, the cycle repeats in the second DRX cycle, $T_1$.

Figure 4C:
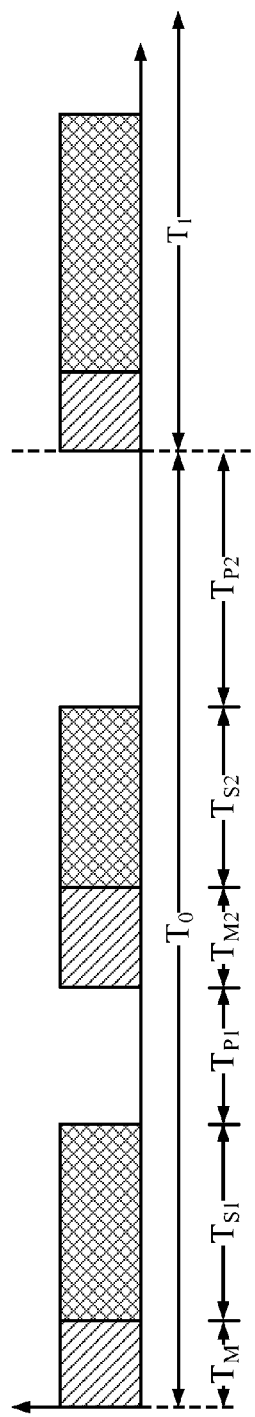
FIG. 4C illustrates another timing diagram of cell searching using an aggressive search pattern.

FIG. 4C illustrates another timing diagram of cell searching using an aggressive search pattern. In one embodiment, a wireless device using such a cell search pattern is being serviced by a Visitor PLMN and is searching for a Home PLMN. The search pattern of FIG. 4C may be used when power conservation is not a concern, such as when the battery level is above a predetermined threshold or if the wireless device is being charged and when channel conditions are changing rapidly to avoid the case where the serving cell signal deteriorates before the next DRX cycle, serving cell reacquisition fails, and the device misses the page.

The timing diagram of FIG. 4C begins, similar to FIGS. 4A and 4B, with the first DRX cycle, $T_0$, which begins with a time period, $T_{M1}$, during which the wireless device reacquires the serving cell and monitors for incoming pages, followed by a time period, $T_{S1}$, during which the wireless device searches for a cell of the Home PLMN, followed by a time period, $T_{P1}$, during which the device enters a power-conservative mode by switching off most of its circuitry. The timing diagram of FIG. 4C differs from that of FIGS. 4A and 4B in that the first DRX cycle, $T_0$, also includes a second time period, $T_{M2}$, during which the wireless device reacquires the serving cell and monitors for incoming pages, followed by a second time period, $T_{S2}$, during which the wireless device searches for a cell of the Home PLMN, followed by a second time period, $T_{P2}$, during which the device enters a power-conservative mode by switching off most of its circuitry. As shown in FIG. 4C, $T_{S1}$ and $T_{S2}$ may be unequal. As in FIGS. 4A and 4B, the cycle repeats in the second DRX cycle, $T_1$.

Figure 5:
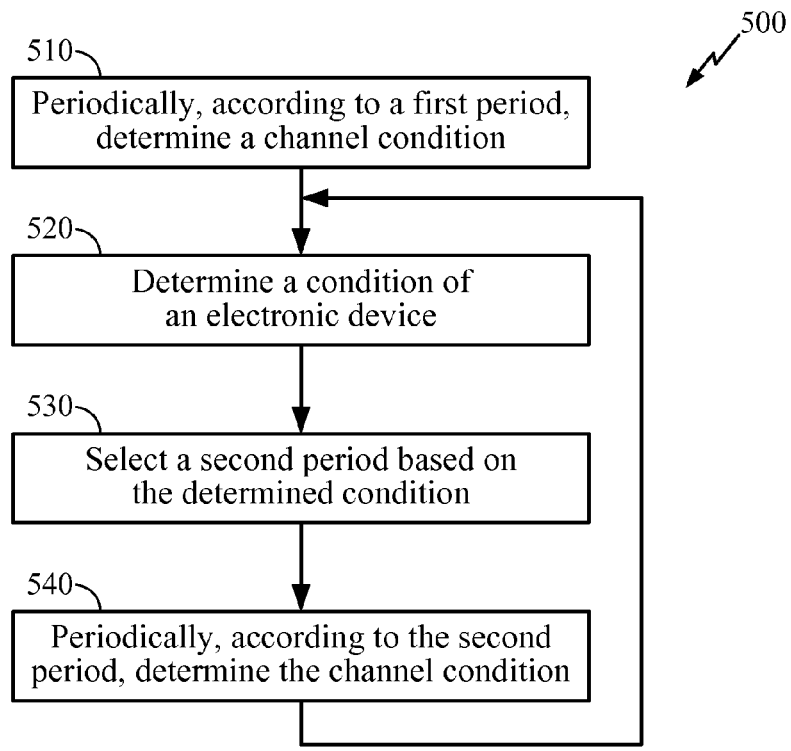
FIG. 5 is a flowchart illustrating a method of determining channel conditions.

The monitoring and searching procedures discussed above with respect to FIGS. 3A-3B and 4A-4C fall under a more general method of determining channel conditions. FIG. 5 is a flowchart of a method 500 of determining channel conditions at an electronic device, such as the wireless communication device 100 of FIG. 1. The process 500 begins, in block 510, with the periodic determination, at a first period, of a channel condition of at least one channel. One or more of the transceiver 160, modem 150, and processor 110 can determine the channel condition based on, for example, signals received via the antenna 170. In one embodiment, the channel condition is value indicative of a signal power received over a particular channel. In another embodiment, the channel condition is a value indicative of a signal-to-noise ratio of a channel. In another embodiment, the channel condition is a Boolean condition indicative of whether the channel is "good" or "bad." This condition may be determined by analyzing a cyclic redundancy check (CRC) transmitted over the channel. The channel condition is determined for at least one channel. In one embodiment, the channel conditions for more than one channel are determined. For example, the channel condition of a channel of a serving cell and a channel condition of a channel of a neighboring cell can both be determined every first period.

The process 500 continues to block 520 where a condition of the electronic device is determined. The determination can be performed by, e.g., the processor 110. In one embodiment, the condition is a Boolean condition. For example, in one embodiment, the condition is indicative of whether the electronic device is receiving power from an external power source. For example, if the wireless communication device 100 of FIG. 1 is connected, via a battery charger, to a wall socket or cigar lighter receptacle, the condition may indicate this connection. In one embodiment, the condition is indicative of whether the electronic device is receiving at least a predetermined threshold amount of power from an external power source. In another embodiment, the condition is a Boolean condition indicative of whether a battery level of the battery is above a predetermined threshold or whether a speed or velocity of the electronic device is above a predetermined threshold. In another embodiment, the condition of the electronic device is a Boolean condition indicative of whether the channel serving the electronic device has a received signal power above a predetermined threshold, a signal-to-noise ratio above a predetermined threshold, or a variability metric above a predetermined threshold. In yet another embodiment, the condition of the electronic device is a Boolean condition indicative of whether the channel serving the electronic device is a "good" channel. A Boolean condition can be stored in the memory 120 as a one-bit flag, which is designated '1' if the condition is true or '0' if it is not.

In another embodiment, the condition of the electronic device is a non-Boolean condition, which can take either more than two discrete values or a continuous value. For example, in one embodiment, the condition is indicative of an amount of power being received from an external power source or a battery charge level of the battery 180 of the wireless communication device 100. The battery charge level, and thus, the charging condition, may be represented by one of a number of discrete values, such as 25%, 50%, 75%, and 100%. In another embodiment, the condition is indicative of a speed or velocity of the electronic device. In another embodiment, the condition of the electronic device is based on channel serving the electronic device and may be a received signal power, a signal-to-noise ratio, or a variability metric. The variability metric may be high if the channel conditions are changing and low if the channel conditions are not changing. For example, the variability metric may be based on the variation of a filter coefficient adaptively changed to minimize the error between the filtered and instantaneous signal.

Next, in block 530, a second period is selected based on the determined condition. In one embodiment, the processor 110 selects the second period. The second period may be selected by the processor 110 using a look-up table stored in the memory 120. For example, the second period may be selected as equal to the first period if the condition is false, but different than the first period if the condition is true. In another embodiment, the processor 100 selects the second period using an equation including the condition as an input variable. For example, the period may be increased or decreased proportionally to the charge level of the battery 180.

Based on the second period determined in block 530, the process 500 continues to block 540 with the periodic determination, at the second period, of the channel condition of the at least one channel. The step associated with block 540 can be performed as described above with respect to block 510 with the exception of the periodicity being the second period, which may be different from the first period. The process 500 at least partially repeats by returning to block 520 where a condition of the electronic device is determined.

Figure 6:
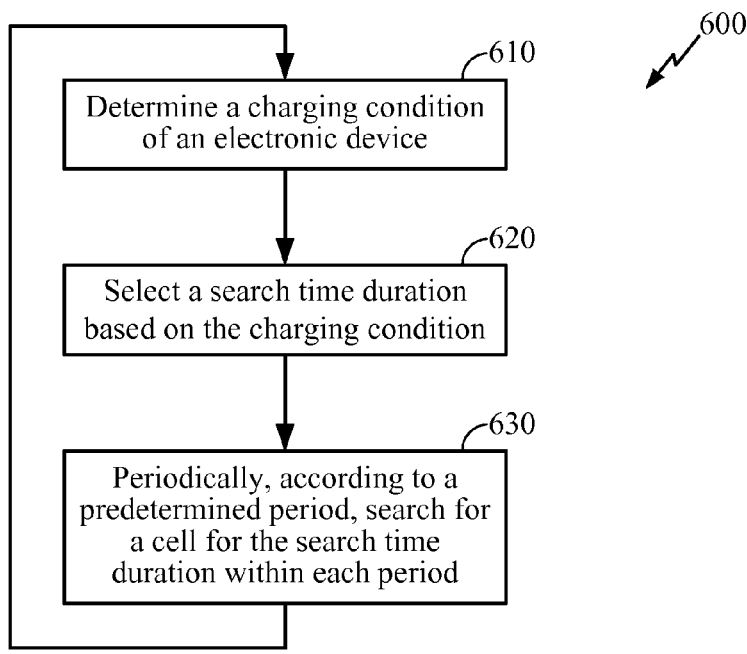
FIG. 6 is a flowchart illustrating a method of searching for a cell.

FIG. 6 is a flowchart illustrating a method 600 of searching for a cell. The method 600 begins, in block 610, with the determination of a charging condition of an electronic device. The determination can be performed by, e.g., the processor 110 of FIG. 1. In one embodiment, the condition is a Boolean condition. For example, in one embodiment, the condition is indicative of whether the electronic device is receiving power from an external power source of if the battery level is above a predetermined threshold. For example, if the wireless communication device 100 of FIG. 1 is connected, via a battery charger, to a wall socket or cigar lighter receptacle, the condition may indicate this connection. A Boolean condition can be stored in the memory 120 as a one-bit flag, which is designated '1' if the condition is true or '0' if it is not.

In another embodiment, the condition of the electronic device is a non-Boolean condition, which can take either more than two discrete values or a continuous value. For example, in one embodiment, the condition is indicative of an amount of power being received from an external power source or a battery charge level of the battery 180 of the wireless communication device 100. The battery charge level, and thus, the charging condition, may be represented by one of a number of discrete values, such as 25%, 50%, 75%, and 100%.

Next, in block 620, a search time duration is determined based on the charging condition. In one embodiment, the processor 110 selects the search time duration. The search time duration may be selected by the processor 110 using a look-up table stored in the memory 120. For example, the search time duration may be selected as a first duration if the charging condition is false, but a second duration if the condition is true. In another embodiment, the processor 100 selects the search time duration using an equation including the charging condition as an input variable. For example, the search time duration may be increased or decreased proportionally to the charge level of the battery 180.

Based on the search time duration determined in block 620, the process 600 continues to block 630 with the periodic search for a cell, at a predetermined period, for the search time duration within each period. That is, during each predetermined period, the electronic device spends an amount of time equal to the search time duration searching for a cell. For example, the electronic device may be searching for a cell of a Home PLMN while being served by a cell of a Visitor PLMN. In this case, the predetermined period may be the DRX cycle. The amount of time spent searching need not be consecutive, as illustrated in FIG. 4C. The process 600 at least partially repeats by returning to block 610 where a charging condition of the electronic device is determined.

Figure 7:
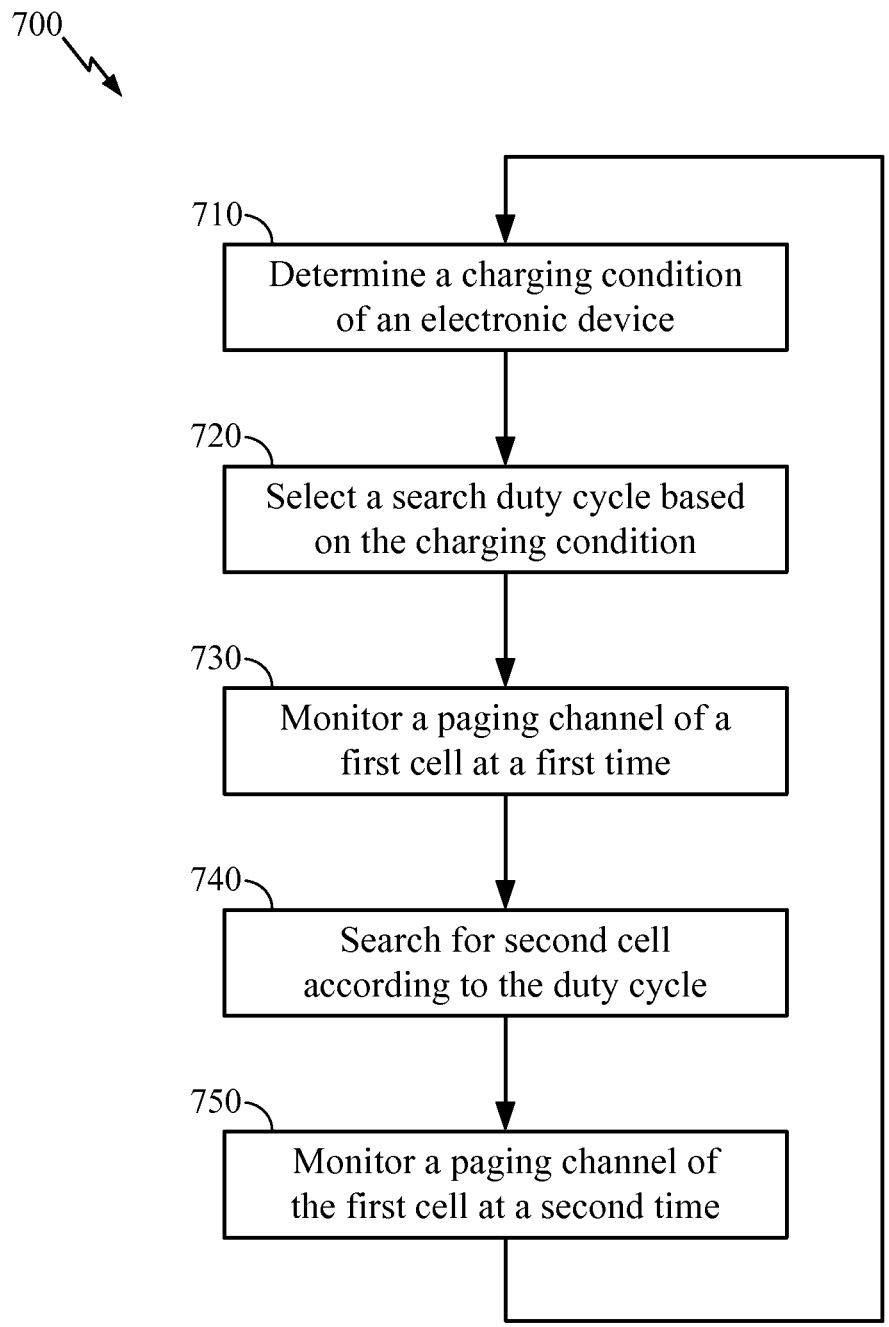
FIG. 7 is a flowchart illustrating another method of searching for a cell.

FIG. 7 is a flowchart illustrating another method 700 of searching for a cell. The method 700 begins, in block 710, with the determination of a charging condition of an electronic device. The step associated with block 710 can be performed as described above with respect to block 610 of FIG. 6.

Next, in block 720, a search duty cycle is determined based on the charging condition. In one embodiment, the processor 110 selects the search duty cycle. The search duty cycle may be selected by the processor 110 using a look-up table stored in the memory 120. For example, the search duty cycle may be selected as a first duty cycle if the charging condition is false, but a second duty cycle if the condition is true. In another embodiment, the processor 100 selects the search duty cycle using an equation including the charging condition as an input variable. For example, the search duty cycle may be increased or decreased proportionally to the charge level of the battery 180.

Continuing, in block 730, a paging channel of a first cell is monitored at a first time. In order to monitor the paging channel, the electronic device may need to reacquire the first cell. In one embodiment, the electronic device monitors the paging channel of the first cell, and if an incoming page is received, initiates a call and enters an active mode. At the same first time, or near to it, the electronic device may also determine a channel condition of the paging channel of the first cell or another channel of the first cell.

In block 750, after block 740 described below, the paging channel of the first cell is similarly monitored at a second time. The second time may be a predetermined time from the first time, such as a DRX cycle or 2.56 seconds.

Between the two monitoring steps of block 730 and 750, in block 740, a search for a second cell is performed according to the determined duty cycle. For example, the electronic device may be searching for a cell of a Home PLMN while being served by a cell of a Visitor PLMN. The amount of time spent searching versus the amount of time spent sleeping (or not searching) between the first time and second time is determined according to the duty cycle and is based on the charging condition. The amount of time spent searching need not be consecutive, as illustrated in FIG. 4C. The process 700 at least partially repeats by returning to block 710 where a charging condition of the electronic device is determined.

Figure 8:
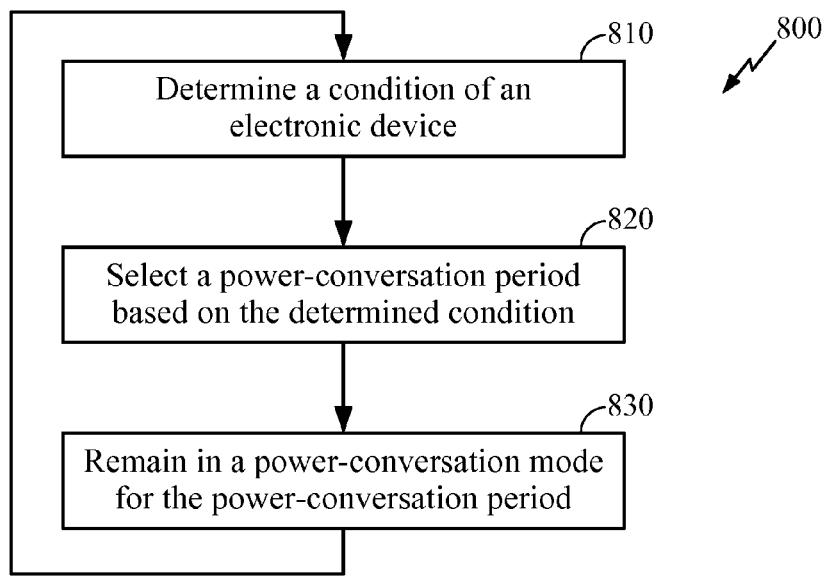
FIG. 8 is a flowchart illustrating a method of conserving power in an electronic device.
Figure 9:
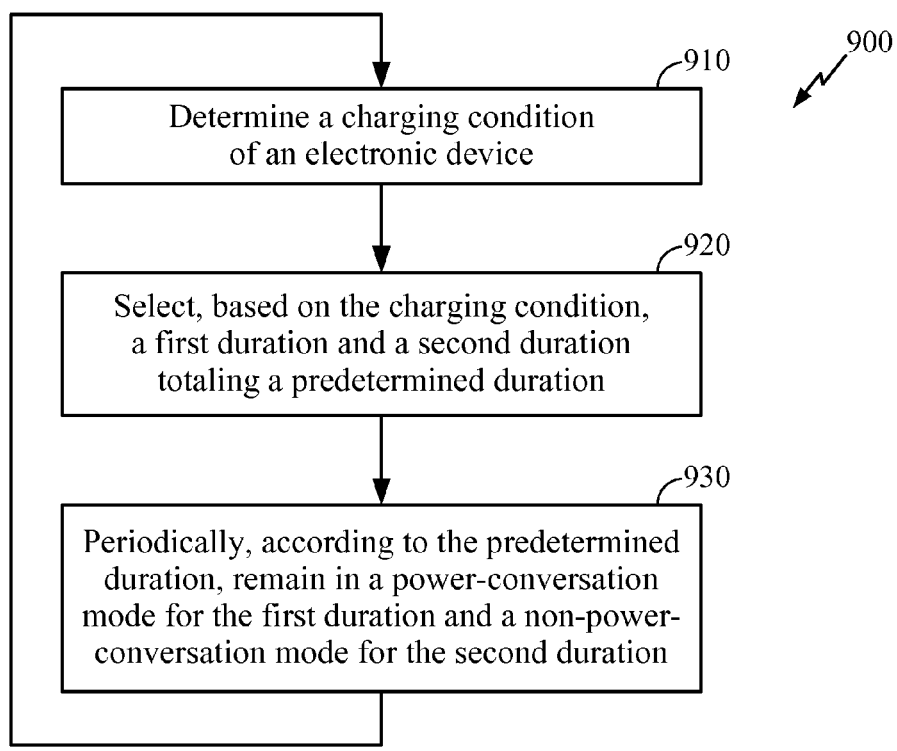
FIG. 9 is a flowchart illustrating another method of conserving power in an electronic device.

FIGS. 8 and 9 are flowcharts illustrating methods of conserving power in an electronic device. FIGS. 8 and 9 each reference a power-conservation mode. As described above with respect to FIG. 2, a wireless communication device can conserve battery power by turning off most of its circuitry when that circuitry is not in use and is not expected to be used. If the device is being serviced by a first cell and desires to monitor the first cell or another cell or to search for another cell, particular circuitry needs to be powered to perform the monitoring or the searching operation. Therefore, the device cycles between a non-power-conservation mode wherein particularly circuitry is powered and a power-conservation mode wherein particular circuitry is not powered. Accordingly, the device uses more power, either from a battery or an external power source or both, while in a non-power-conservation mode than while in a power-conservation mode.

Entering a power-conservation mode from a non-power-conservation mode is identifiable by the depowering of particular circuitry, while exiting the power-conservation mode into the non-power-conservation mode is identifiable by the powering of particular circuitry.

FIG. 8 is a flowchart illustrating a method 800 of conserving power in an electronic device. The method 800 begins, in block 810, with the determination of a condition of an electronic device. The step associated with block 810 can be performed as described above with respect to block 520 of FIG. 5.

Next, in block 820, a power-conservation period is selected based on the determined condition. In one embodiment, the processor 110 selects the power-conservation period. The power-conservation period may be selected by the processor 110 using a look-up table stored in the memory 120. For example, the power-conservation period may be selected as equal to a first period of time if the condition is false, but a second period of time if the condition is true. In another embodiment, the processor 100 selects the power-conservation period using an equation including the condition as an input variable. For example, the power-conservation period may be increased or decreased proportionally to the charge level of the battery 180.

Continuing, in block 830, the device enters a power-conservation mode and remains in the mode for the power-conservation period determined in block 820. Entering the power-conservation mode may include depowering the circuitry of the electronic device used to determine the condition in block 810. This circuitry remains depowered until the determined power-conservation period has passed, at which time the electronic device again powers the circuitry, the process returns to block 810, and the circuitry is used again to determine the condition.

FIG. 9 is a flowchart illustrating another method of conserving power in an electronic device. The method 900 begins, in block 910, with the determination of a charging condition of an electronic device. The step associated with block 910 can be performed as described above with respect to block 610 of FIG. 6.

Next, in block 920, a first duration and a second duration are determined based on the charging condition, wherein the first and second durations total a predetermined time duration. Because the first and second durations total a predetermined duration, the selection of one of the first or second duration immediately implies the other. In one embodiment, the processor 110 selects the first and second durations. The first and second durations may be selected by the processor 110 using a look-up table stored in the memory 120. For example, the first and second durations may be selected as first values if the charging condition is false, but as second values if the condition is true. In another embodiment, the processor 100 selects the first and second durations using equations including the charging condition as an input variable. For example, the first duration may be decreased proportionally to the charge level of the battery 180 while the second duration is increased proportionally to the charge level of the battery.

Continuing, in block 930, the device is periodically, according to the predetermined period, in a power-conservation mode for the first duration and a non-power-conservation mode for the second duration. Entering the power-conservation mode may include depowering the circuitry of the electronic device used to search for a cell, whereas entering the non-power-conservation mode includes powering the circuitry. In some embodiments, the time spent in the power-conservation mode, while totaling the first duration, is not spent in the power-conservation mode consecutively. After block 930, the method 900 returns to block 910 to repeat the process.

Figure 10:
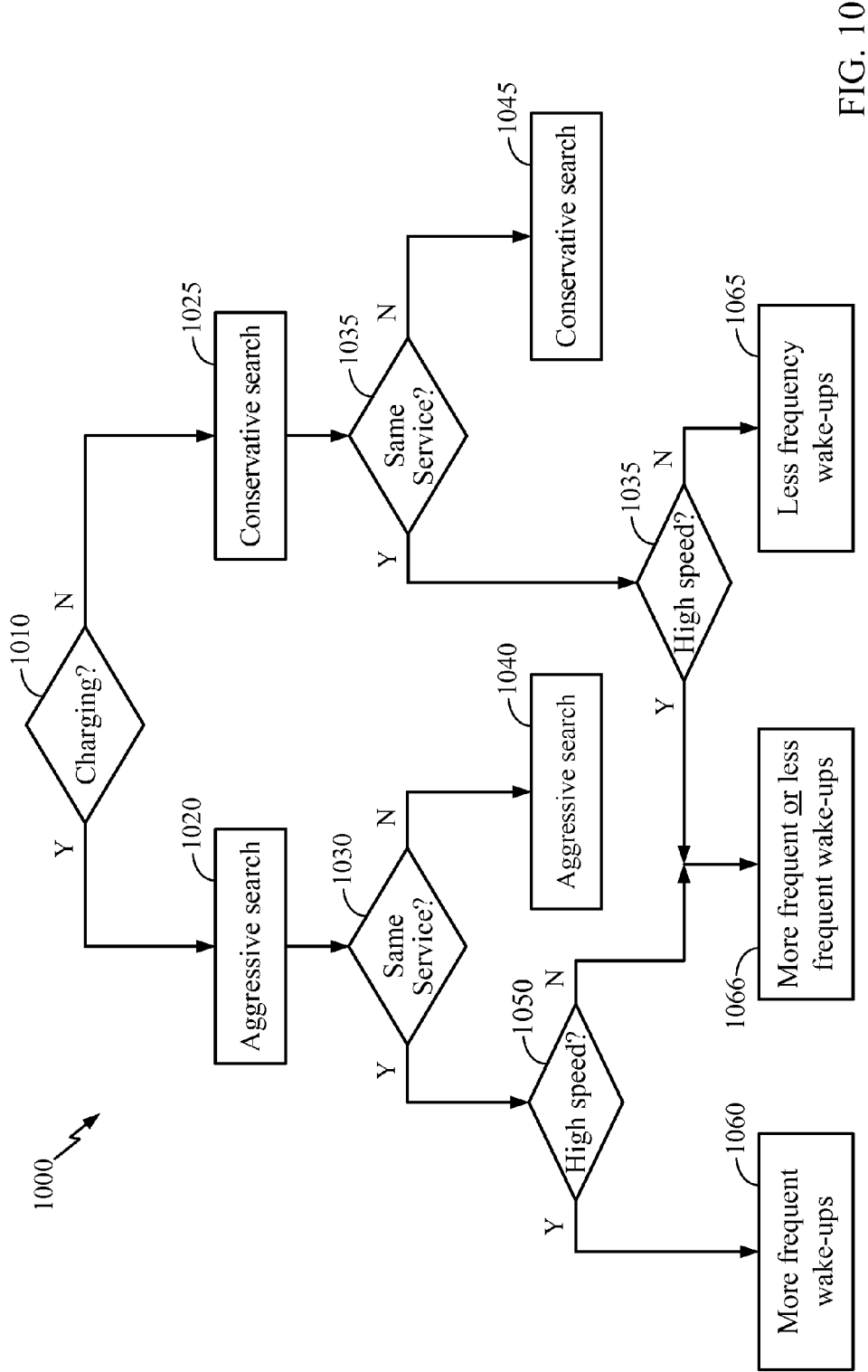
FIG. 10 is a conceptual flowchart illustrating possible searching schemes depending on certain conditions of an electronic device.

FIG. 10 is a conceptual flowchart illustrating possible searching schemes depending on certain conditions of an electronic device. The flowchart begins in block 1010 where it is determined whether or not the electronic device is charging. If the device is charging, the flowchart continues to block 1020 where an aggressive search pattern is selected, whereas if the device is not charging, the flowchart continues to block 1025 where a conservative search pattern is selected. Aggressive and conservative search patterns are illustrated in FIGS. 4A-4C.

From block 1020, the flowchart continues to block 1030 (and from block 1025, the flowchart continues to block 1035) where it is determined whether or not the electronic device is searching for a cell of the same service type or of a different service type. From either of blocks 1025 or 1035, if a cell of a different service type is being searched for, other conditions are not considered and the process moves to either block 1040, confirming the aggressive search, or block 1045, confirming the conservative search. Additional description relevant to out-of-service searching is described in U.S. patent application Ser. No. 12/479,234, herein incorporated by reference in its entirety.

If, in block 1030, it is determined that a cell of the same service type is being searched for, the process moves to block 1050, where it is determined if the electronic device is moving at a high speed. This may be determined, as discussed above with respect to block 520 of FIG. 5, by comparing the speed to a predetermined threshold or by analyzing an adaptive filter coefficient. If it is determined that the electronic device is moving at a high speed, the flowchart continues to block 1060 where more frequent wake-ups are selected. If it is determined that the vehicle is not moving at high speed, the flowchart continues to block 1066 where either more or less frequent wake-ups could be selected. The electronic device is motivated to wake-up more frequently as it is being charged, but it is also motivated to wake-up less frequently because it is not moving at a high speed. Accordingly, either motivation could control, or a balance between the two could be reached.

If, in block 1035, it is determined that a cell of the same service type is being searched for, the process moves to block 1055, where it is determined if the electronic device is moving at a high speed. This may be determined, as discussed above with respect to block 520 of FIG. 5, by comparing the speed to a predetermined threshold or by analyzing an adaptive filter coefficient. If it is determined that the electronic device is not moving at a high speed, the flowchart continues to block 1065 where less frequency wake-ups are selected. If it is determined that the vehicle is moving at high speed, the flowchart moves to block 1066 where either more or less frequent wake-ups could be selected. The electronic device is motivated to wake-up less frequently as it is not being charged, but it is also motivated to wake-up more frequently because it is moving at a high speed. Accordingly, either motivation could control, or a balance between the two could be reached.

While the specification describes particular examples of the present invention, those of ordinary skill can devise variations of the present invention without departing from the inventive concept. Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. The terms signal and threshold can depend upon the signal modulation technique. If Pulse Amplitude Modulation (PAM) is used then the voltage amplitude or power of the signal represents its value. In that case the threshold is simply a power value. If Phase Shift Keying is used, then the phase of the signal, which can translate to the sign of the received signal voltage can represent the signal value. In this case if the signal is integrated over multiple symbols, then the sign and amplitude of the received signal together indicate the signal value.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

The invention claimed is:

1. A method of determining channel conditions at an electronic device, the method comprising:
periodically, according to a first period determining a channel condition of a first channel, wherein the channel condition comprises at least one of a received signal power or a signal-to-noise ratio, and wherein the first channel is a channel of a serving cell;
determining a condition of the electronic device, wherein the determining comprises:
determining a speed of the electronic device,
determining whether the electronic device is receiving power from an external power supply, and
determining a battery charge level of the electronic device;
selecting a second period different from the first period based at least in part on the determined condition of the electronic device;
periodically, according to the second period, determining the channel condition of the first channel; and
initiating service with a second channel, wherein the second channel is a channel serving a neighboring cell, based at least in part on the determined channel condition.

2. The method of claim 1, wherein the second period is shorter than the first period.

3. The method of claim 1, wherein the condition of the electronic device is a Boolean condition.

4. The method of claim 1, wherein the condition of the electronic device is a non-Boolean condition.

5. The method of claim 1, wherein selecting the second period comprises using a look-up table.

6. The method of claim 1, wherein selecting the second period comprises using an equation including the condition as at least one input variable.

7. The method of claim 1, wherein the serving cell and the neighboring cell are cells of the same technology.

8. The method of claim 1, wherein the serving cell and the neighboring cell are cells of different technologies.

9. The method of claim 1, wherein the serving cell and the neighboring cell are cells in the same service provider network.

10. The method of claim 1, wherein the serving cell and the neighboring cell are cells of different service provider networks.

11. An electronic device comprising:
a transceiver configured to wirelessly communicate over at least one channel;
a jack configured to connect the electronic device to an external power supply;
a battery;
a velocity sensor; and
a processor configured to:
periodically, according to a first period, determine a channel condition of a first channel, wherein the channel condition comprises at least one of a received signal power or a signal-to-noise ratio, and wherein the first channel is a channel of a serving cell;
determine a condition of the electronic device, wherein the determining comprises:
determine a velocity of the electronic device,
determine whether the electronic device is receiving power from an external power supply, and
determine a battery charge level of the electronic device;
select a second period different from the first period based at least in part on the determined condition of the electronic device;
periodically, according to the second period, determine the channel condition of the first channel; and
initiate service with a second channel, wherein the second channel is a channel serving a neighboring cell, based at least in part on the determined channel condition.

12. The electronic device of claim 11, wherein the velocity sensor comprises at least one of a global positioning system (GPS), an accelerometer, or an adaptive pilot filtering module.

13. The electronic device of claim 11, further comprising a power interface for wirelessly receiving power via electromagnetic waves from the external power supply, wherein the charging condition of the electronic device is indicative of whether the electronic device is receiving power from the external power supply.

14. An electronic device comprising:
means for periodically, according to a first period, determining a channel condition of a first channel, wherein the channel condition comprises at least one of a received signal power or a signal-to-noise ratio, and wherein the first channel is one a channel of a serving cell;
means for determining a condition of the electronic device, wherein the determining comprises:
determining a speed of the electronic device,
determining whether the electronic device is receiving power from an external power supply, and
determining a battery charge level of the electronic device;
means for selecting a second period different from the first period based at least in part on the determined condition of the electronic device;
means for periodically, according to the second period, determining the channel condition of the first channel; and
means for initiating service with a second channel, wherein the second channel is a channel serving a neighboring cell, based at least in part on the determined channel condition.

15. A computer-readable medium storing instructions which, when executed by one or more processors, causes a computer to perform a method of determining channel conditions at an electronic device, the method comprising:
periodically, according to a first period, determining a channel condition of a first channel, wherein the channel condition comprises at least one of a received signal power or a signal-to-noise ratio, and wherein the first channel is a channel of a serving cell;
determining a condition of the electronic device, wherein the determining comprises:
determining a speed of the electronic device,
determining whether the electronic device is receiving power from an external power supply, and
determining a battery charge level of the electronic device;
selecting a second period different from the first period based at least in part on the determined condition of the electronic device;

periodically, according to the second period, determining the channel condition of the first channel; and initiating service with a second channel, wherein the second channel is a channel serving a neighboring cell, based at least in part on the determined channel condition.

* * * * *